United States Patent [19]

Kanamaru et al.

[11] Patent Number: 5,035,677
[45] Date of Patent: Jul. 30, 1991

[54] A UNIVERSAL POWER TRANSMISSION JOINT HAVING A PAIR OF DRIVE PINS FIXED IN PARALLEL BY A TIE MEMBER

[75] Inventors: Hisanobu Kanamaru, Ibaraki; Naotatsu Asahi, Chiba, both of Japan

[73] Assignees: Hitachi, Ltd., Tokyo; Hitachi Powdered Metals Co., Ltd., Chiba, all of Japan

[21] Appl. No.: 383,213

[22] Filed: Jul. 21, 1989

[30] Foreign Application Priority Data

Jul. 29, 1988 [JP] Japan .................. 63-188484

[51] Int. Cl.$^5$ .............................. F16D 3/16
[52] U.S. Cl. .................. 464/138; 464/102; 464/904
[58] Field of Search ............... 403/56, 128, 131; 464/102, 106, 121, 137, 138, 147, 155, 904

[56] References Cited

U.S. PATENT DOCUMENTS

| 981,736 | 1/1911 | Zock | 464/138 |
| 1,322,474 | 11/1919 | Allen | 464/155 X |
| 1,821,215 | 9/1931 | Hahn | 464/138 |
| 3,304,743 | 2/1967 | Paulsen | 464/137 X |

FOREIGN PATENT DOCUMENTS

| 419054 | 10/1910 | France | 464/138 |
| 46120 | 4/1981 | Japan . | |
| 116923 | 9/1981 | Japan . | |
| 13921 | 1/1988 | Japan | 464/137 |
| 623640 | 6/1981 | Switzerland | 464/138 |

Primary Examiner—Daniel P. Stodola
Attorney, Agent, or Firm—Antonelli, Terry, Stout & Kraus

[57] ABSTRACT

A power transmission joint comprises a pair of rotational members each having a rotation axis and arranged so as to be axially spaced from each other. A guide pin is disposed between the pair of rotational members and has an end portion thereof rotatably and swingably engaged with opposite end portions of the rotational members at rotation axes, respectively. A pair of drive pins are arranged symmetrically with respect to and in parallel to an axis of the guide pin and each is engaged with the opposite ends of the rotational members so as to transmit torque while allowing the drive pins to slide in a radial direction on the rotational members, swing and axially slide. A member is disposed between the pair of rotational members and rigidly ties the guide pin and the drive pins to keep a prescribed fixed relation therebetween.

12 Claims, 4 Drawing Sheets

A UNIVERSAL POWER TRANSMISSION JOINT HAVING A PAIR OF DRIVE PINS FIXED IN PARALLEL BY A TIE MEMBER

BACKGROUND OF THE INVENTION

The present invention relates to a power transmission joint and, more particularly, to a universal rotational power transmission joint for transmitting torque from a first rotational member to a second rotational member, with a rotational axis of the first rotational member being inclined with respect to the rotational axis of the first rotational member or in parallel to and radially spaced from the first rotational member.

A uniform rotational joint which connects a drive shaft and a driven shaft the axes of which are parallel and eccentric is disclosed in Japanese Patent Laid-Open No. 56-116923/1981.

The joint comprises drive and driven discs each having a through hole at the center, a pipe on a backside thereof and a flat surface on a front side, with an intermediate disc disposed between the drive disc and driven disc so as to be guided by the flat surfaces of the drive and driven discs. The intermediate disc has a hole at the center and a pair of radially slits formed symmetrically with respect to the central hole with a lever passing through the central hole of the intermediate disc. A central portion of the lever is pivotally mounted on the intermediate disc, with the lever having, at both ends thereof, balls which pass through the through holes of the drive and driven discs and are disposed in the pipes whereby an axis of the intermediate disc is disposed on a line passing the axes of the drive and driven discs. A pin has one end secured to the drive disc and the other end inserted in the slit of the intermediate disc and another pin is disposed symmetrically to the previously mentioned pin with respect to the central hole of the intermediate disc, one end of which pin is secured to the driven disc and the other end inserted in the slit of the intermediate disc. When the drive disc is rotated, the rotation is transmitted to the intermediate disc through the pin secured to the drive disc, and the rotation of the intermediate disc is transmitted to the driven disc through the pin secured to the driven disc, whereby the rotation is transmitted from the drive disc to the driven shaft, with uniform rotation.

The conventional joint is not constructed so that the drive shaft smoothly transmits the rotation thereof to the driven shaft with uniform rotation when the rotational axis of the drive disc is inclined against the rotational axis of the driven disc. In such a case, the intermediate disc can not be sufficiently guided by the driven and drive discs so that swinging motion takes place. The pins each comes to contact with an edge of the slit of the intermediate disc, whereby rotation transmission becomes unstable. Noises also take place because of plays due to mechanical wear.

Further, pulsation takes place at a high speed rotation because the rotation transmission between the drive disc and the intermediate disc, and between the intermediate disc and the driven disc is effected by a single pin, whereby rotation balance is destroyed when the discs rotates at a high speed.

Therefore, conditions under which the conventional joint can be utilized are limited and there are problems with respect to power transmission of large torque and high speed rotation, or life of the joint.

Another joint which can be used for a pair of shafts to be connected which are inclined or eccentric with respect to each other is disclosed in Japanese Patent Laid-Open No. 56-46120/1981. The joint comprises a pair of sleeves each fixedly receiving the shaft, annular members each fixed to the sleeve and having sockets formed therein and annularly and equiangularly spaced from each other, balls each movably inserted in the socket and having a through hole, and pins each slidably inserted in the through holes of the balls thereby providing a joint.

An opening, of each of the ball sockets of one of the annular members, positioned at an opposite side to the other annular member is tapered so that inclination of each pin is allowed. The joint can transmit torque or rotation in case the shafts to be connected are inclined to or eccentric to each other, however, the joint can not transmit at a constant velocity rotation. Further, when the rotation is transmitted from one shaft to another, the pins each incline in the rotational direction as well as inclination against rotating axes thereof, and torque or rotation is transmitted through a contact of ball and pin and a contact of pin and the opening portion of the annular member. Thus, the joint is unlikely to smoothly rotate at high speed.

SUMMARY OF THE INVENTION

An object of the present invention is to provide a power transmission joint which is simple in construction and can effect uniform rotation both in case a drive shaft inclines against a driven shaft, and in case the drive shaft is in parallel and eccentric to the driven shaft.

Briefly stated, the present invention resides in a power transmission joint comprising a pair of rotational members such as, for example, rotatable shafts or block members connected to rotatable shafts, each having an axis of rotation arranged so as to be axially spaced from each other, with a guide pin disposed between the pair of rotational members and having an end portion thereof rotatably and swingably engaged with opposite end portions of the rotational members at rotation axes, respectively. A pair of drive pins are arranged symmetrically with respect to and in parallel to an axis of the guide pin and engaged with the opposite ends of the rotational members so as to transmit torque while allowing the drive pins to slide in a radial direction on the rotational members, swing and axially slide. A member is disposed between the pair of rotational members and rigidly ties the guide pin and the drive pins to maintained a prescribed fixed relation therebetween.

According to an aspect of the present invention, the drive pins are slidably inserted in spherical bearings in bearing grooves formed in an opposite end of the each rotational member. The bearing grooves each having a pair of partially-cylindrical surfaces for holding the spherical bearing so as to rotate and radially slide.

According to another aspect of the present invention, the guide pin has ends formed semi-spherically and inserted movably in the bearing receiving hole. The ends serves as bearings.

According to further another aspect of the present invention, the guide pin is engaged with the rotational members such as rotational shafts at both ends thereof through spherical bearings rotatably and swingably inserted in the rotational members, and the drive pins are engaged with the opposite end portions of the rotational members through spherical bearings slidably inserted in bearing grooves formed in the opposite end portions. The bearing grooves each extend axially and have radially extending partially cylindrical surfaces so as to allow the spherical bearings to move radially and rotate in the grooves so that the drive pins can be swing and slide radially and axially relative to the rotational members. The member tying the guide pin and the drive pins is preferable fashioned as a disc.

The guide pin and the drive pins are tied by the member so that the drive pins are always in parallel to the guide pin and symmetrical with respect to the axis of the guide pin. The drive pins are engaged to be swingable and radially and axially slidable in the rotational member groove. Therefore, when one of the rotational members is inclined or eccentric to the other, the drive pins can be moved radially relative to the rotational member while allowing relative axial movement of the rotational member. Further, spherical bearings supporting end portions of the drive pins move symmetrically with respect to a point when the two rotational members are eccentric, and symmetrically with respect to a center line between the two rotational members, whereby one of the rotational members rotates at the same speed as the other.

DESCRIPTION OF THE INVENTION

Figure 1:
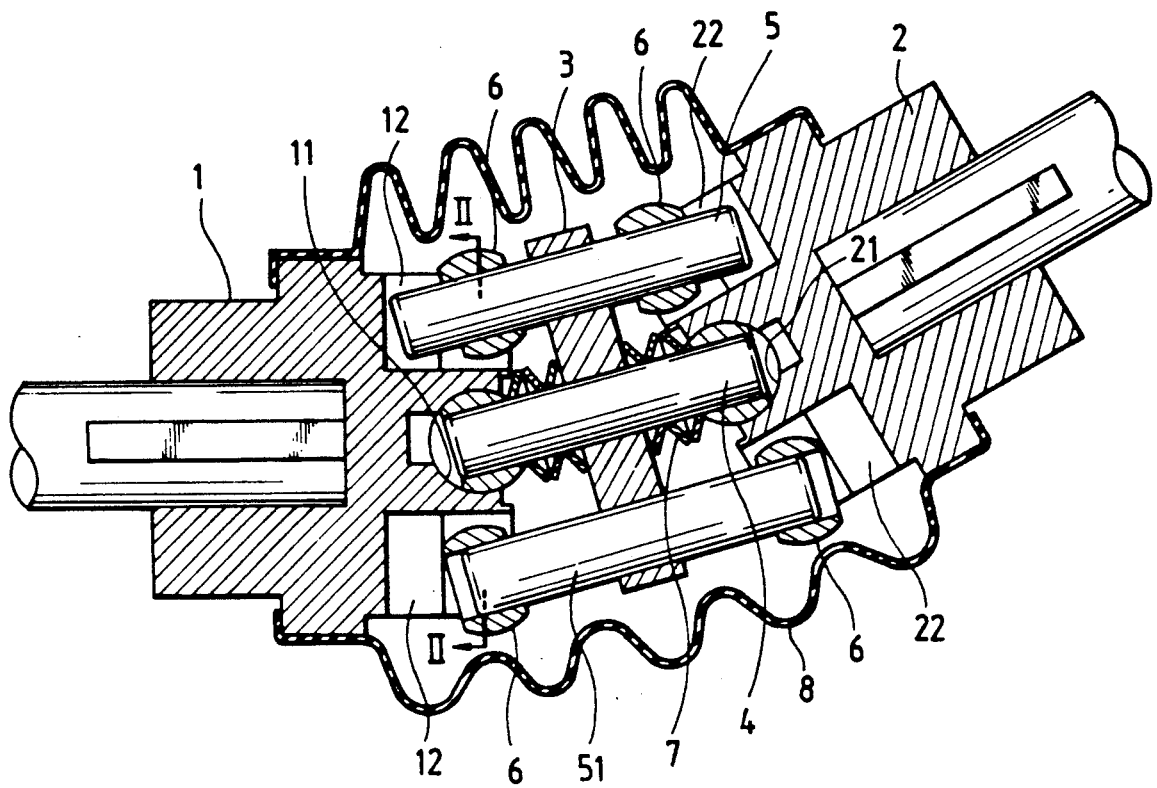
FIG. 1 is a sectional view of an embodiment of a power transmission joint according to the present invention.
Figure 2:
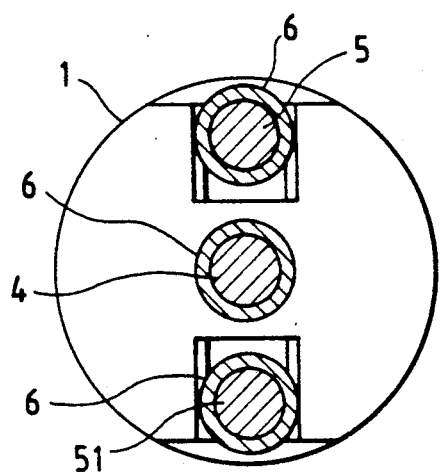
FIG. 2 is a sectional view taken along a line II—II of FIG. 1.
Figure 3:
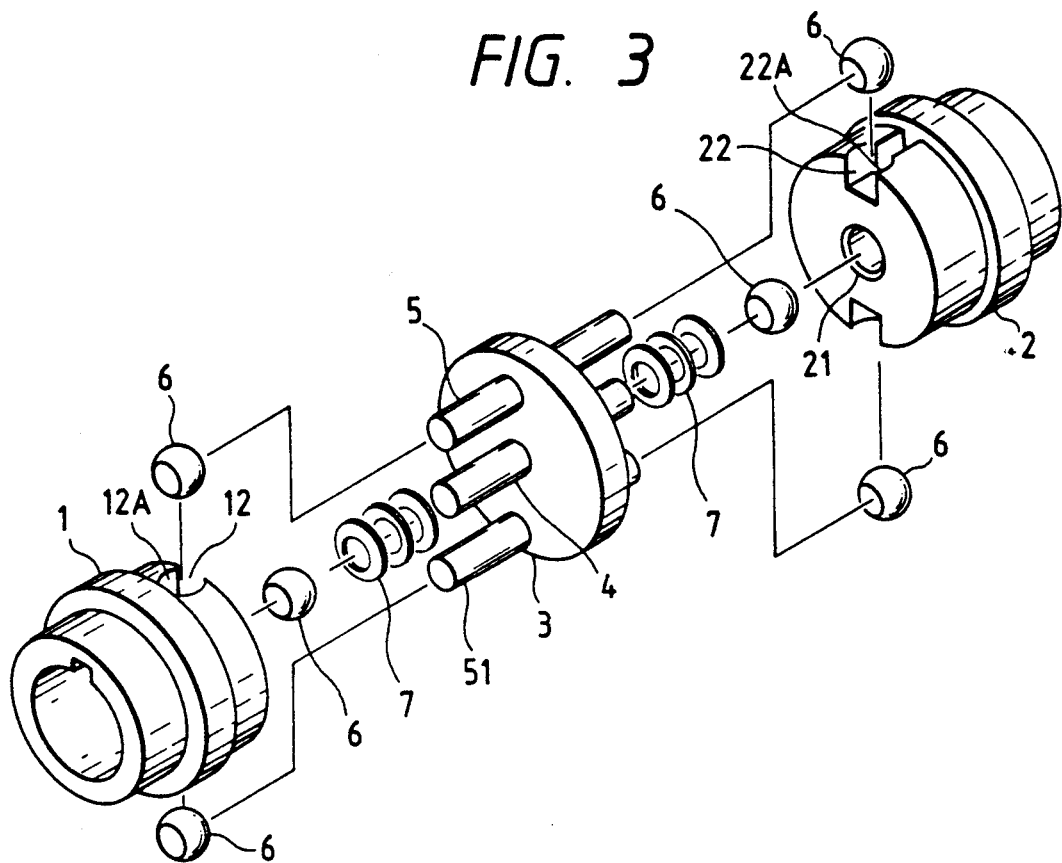
FIG. 3 is a perspective view of disassembled parts of the power transmission joint shown in FIG. 1.

Referring now to the drawings wherein like reference numerals are used throughout the various views to designate like parts and, more particularly, to FIGS. 1 and 2, according to these figures, a power transmission joint constructed in accordance with the present invention includes an input shaft 1, rotatably driven by a drive mechanism (not shown), and an output shaft 2, driven by the input shaft 1, each shaft 1, 2 being formed by cold press working or machining in a conventional manner. An end portion of each of the input and output shafts 1, 2 is provided with a spherical surface hole 11, 21 at a rotation axis thereof, and a pair of bearing grooves 12, 22 each formed on a radially extending line passing the rotation axis so as to space equidistance from the spherical surface hole 11, 21, that is, symmetrically with respect to the spherical surface hole 11, 21 as shown in FIG. 2 and so as to axially extend from the end surface of each of the input and output shafts. As shown in FIG. 3, partially-cylindrical surfaces 12A, 22A extending radially and having openings at a peripheral portion of each of the input and output shafts are formed in the bearing grooves 12, 22 at inlet side of the bearing grooves 12, 22. A pair of the partially cylindrical surfaces 12A, 22A rotatably and radially slidably hold a spherical bearing therebetween.

A tie member 3 which is shaped in a disc is disposed between the input shaft 1 and the output shaft 2. The tie member, that is, the disc 3 is made of light metal such as aluminum, however, any other material, for example, steel, can be used for the disc 3. The disc 3 has three holes one of which is formed so as to pass through at a central axis thereof, and the other holes spaced equidistance from the central hole, that is, symmetric with respect to the central hole.

A guide pin 4, made of steel, is press-fitted into the central hole of the disc 3 so that both sides thereof will project preferably equidistantly from the disc.

Drive pins 5, 51, slightly longer than the guide pin 4, each are press-fitted into the hole of the disc 3 so that the drive pins 5, 51 will project preferably equidistantly from the both sides of the disc 3 and be in parallel to and equidistant from the guide pin 4.

Each of the guide pin 4 and drive pins 5, 51 has conventional spherical bearings 6 slidably inserted at ends thereof. The bearings 6 are made of steel or alloy bearing material. The guide pin 4 and the drive pins 5, 51 are preferably tempered taking into consideration wear.

A plurality of spring washers 7 are provided to stably hold the spherical bearings 6 for the guide pin 4 in the spherical surface holes 11, 21 of the input and output shafts, 1, 2 while axial position of the disc 3 is fixed by the spring washer 7. The number of the spring washers on one side of the disc 3 is preferably the same on the other side. Further, preferably, a dust cover 8 made of rubber is provided to sealingly cover the joint portion of the input and output shafts 1, 2 so as to prevent the joint portion from entering of dusts.

As shown in FIG. 3, first the spherical bearings 6 are inserted in the spherical surface holes 11, 21 and the bearing grooves 12, 22 of the input shaft 1 and the output shaft 2. Next, the spring washers 7 are mounted on the guide pin 4. Finally, the guide pin 4 having the spring washers 7 mounted thereon and the drive pins 5, 51 are inserted in the holes of the spherical bearings 6 at the same time, whereby engagement between the input shaft 1 and the output shaft 2 is made. In the joint constructed in the above-mentioned manner, an assembly of the disc 3, the guide pin 4 and the drive pins 5, 51 can be made by fixedly mounting guide pins and drive pins on both side portions of the disc 3 so as to extend symmetrically from the side portions, without passing the guide pin 4 and the drive pins 5, 51 through the disc 3.

Figure 4:
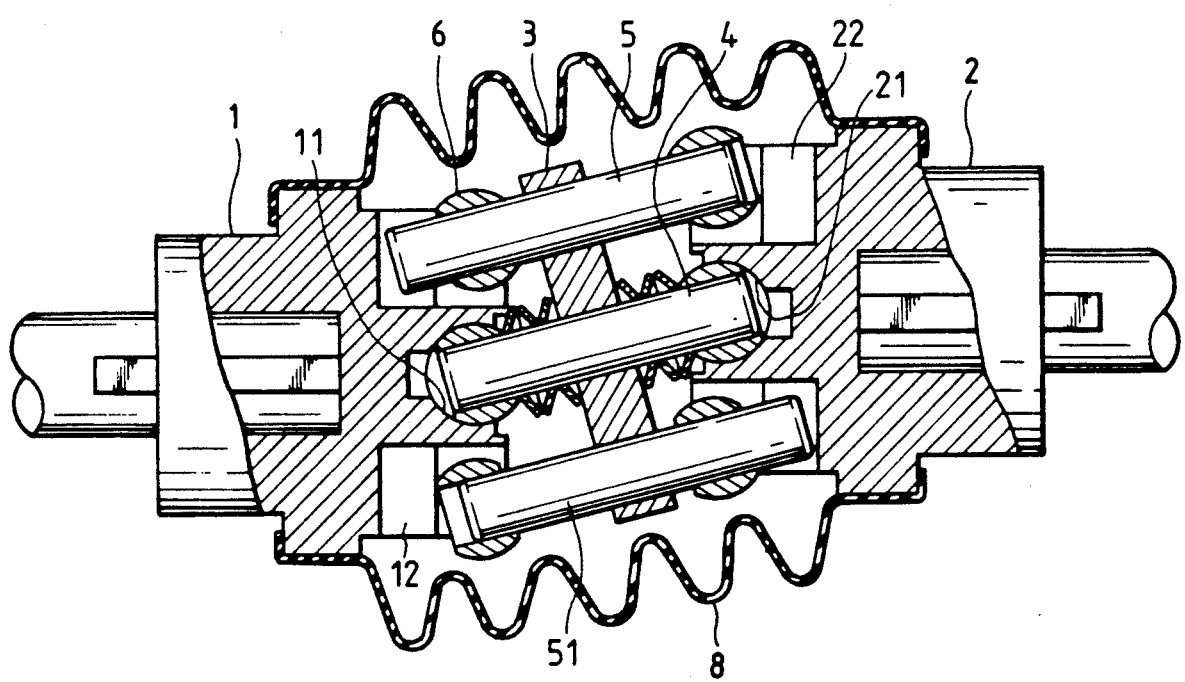
FIG. 4 is a sectional view showing another operational condition of the power transmission joint shown in FIG. 1.

The spherical bearings 6 are slidable in the bearing grooves 12, 22 of the input and output shafts 1, 2 in the radial direction, whereby radial movement of the spherical bearings 6 for the drive pins 5, 51 is allowed when the input shaft 1 and the output shaft 2 are inclined against each other as shown in FIG. 1 or eccentric to each other as shown in FIG. 4.

The input shaft 1 and the output shaft 2 are symmetrical with respect to a line spaced equidistantly from the opposite ends of the input and output shafts 1, 2 in case of FIG. 1 or with respect to the central point of guide pin 4 in case of FIG. 4, so that the input and output shafts 1, 2 are the same in rotational speed as each other. Therefore, if the input shaft 1 rotates uniformly, the output shaft 2 also rotates uniformly. Namely, the input shaft 1 rotates uniform, the disc 3 nonuniformly and the output shaft 2 uniformly. The joint is theoretically stable and high in mechanical efficiency.

In FIG. 1, there is illustrated an example of use of the input shaft 1 and the output shaft 2, wherein their rotation axes are inclined against each other, and FIG. 4 is another example of use, wherein the input shaft 1 and the output shaft 2 are eccentric to each other. In any example of use, the input shaft 1 can rotate uniformly (at a constant rotational speed) the output shaft 2.

According to the above-mentioned embodiment of the present invention, a pair of the spherical bearings 6 for the guide pin 4 set rotation centers of the input shaft 1 and the output shaft 2, whereby the shafts 1, 2 rotates around the rotation center. On the other hand, two pair of the spherical bearings for the drive pins 5, 51 are allowed to radially slide on the input and output shafts 1, 2 according to an amount of eccentricity or inclination angle of the two shafts 1, 2.

Therefore, when the input shaft 1 is eccentric to the output shaft 2, the spherical bearings 6 for the drive pins 5, 51 move symmetrically with respect to a point and symmetrically with respect to a line between the input shaft 1 and the output shaft 2 when the shafts 1, 2 are inclined against each other. By this movement, when the input shaft 1 moves uniformly, the movement of the output shafts 2 becomes completely uniform. Although the disc 3 is moved nonuniform the inertia of the disc 3 is small, so that the nonuniform movement of the disc 3 does not make vibration. Therefore, the joint can be used for transmission of a high speed rotation and a large torque and the joint is high in transmission efficiency. Further, since the joint is simple in construction, it is low in cost, and the life is long.

Figure 5:
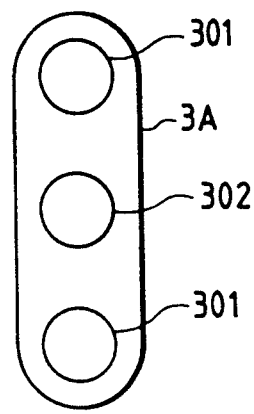
FIG. 5 is a front view of another embodiment of a tie member according to the present invention.

The tie member 3 for tying the guide pin 4 and the drive pins 5, 51 can be formed of an elongate plate member 3A as shown in FIG. 5 instead of the disc 3. The elongate plate member 3A has a hole 301 for the guide pin 4 at a central portion, and a pair of holes 301 for the guide pins 5, 51. The plate member 3A is effective to decrease a rotational inertia.

Figure 6:
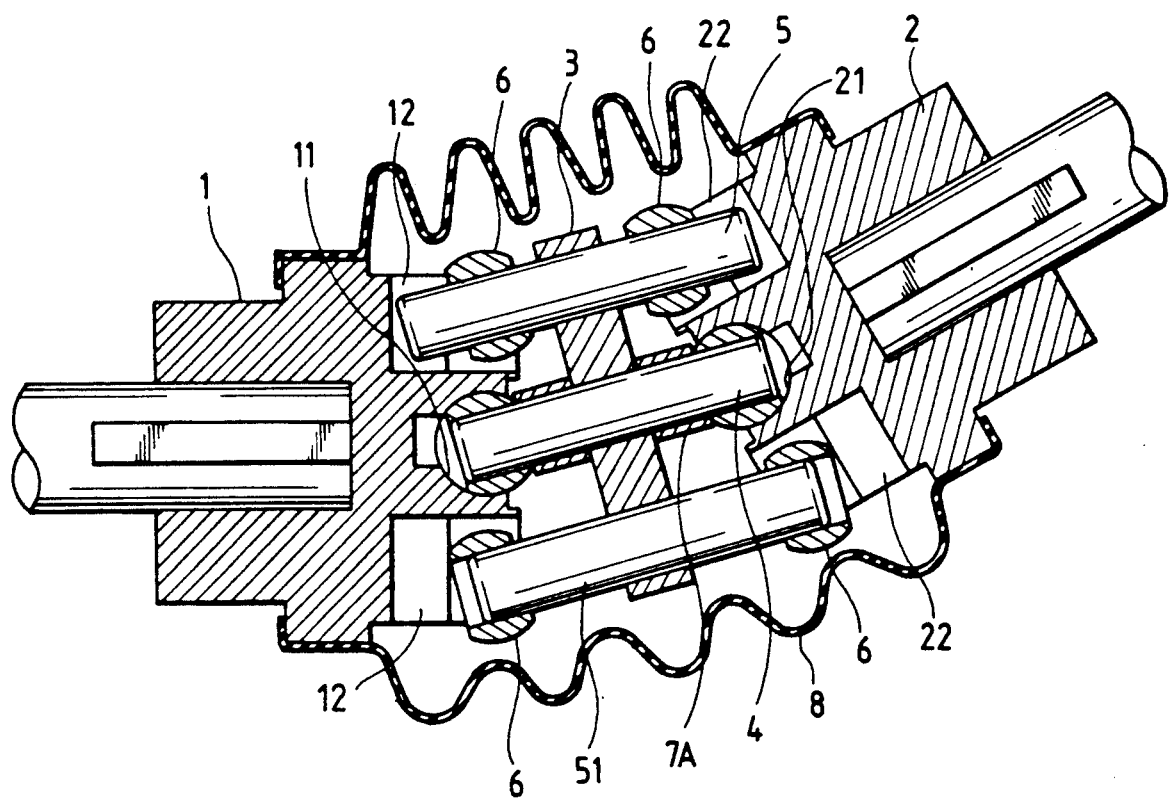
FIG. 6 is a sectional view of another embodiment of a power transmission joint according to the present invention.

FIG. 6 is the same as in FIG. 1 except that a pair of spacers tubes 7A are used instead of the spring washers 7.

In FIG. 6, the spacer tubes 7A each are mounted on the guide pin 4 to restrict axial movement of the tie member 3 (3A) and to cause the spherical bearings 6 to rest on the spherical surface holes 11, 21.

It also is possible to employ the spacer tube 7a on the guide pin 4 on one side of the tie member 3 (3A) and the spring washers 7 on the other side, whereby the tie member 3 (3A) can be axially fixed.

Figure 7:
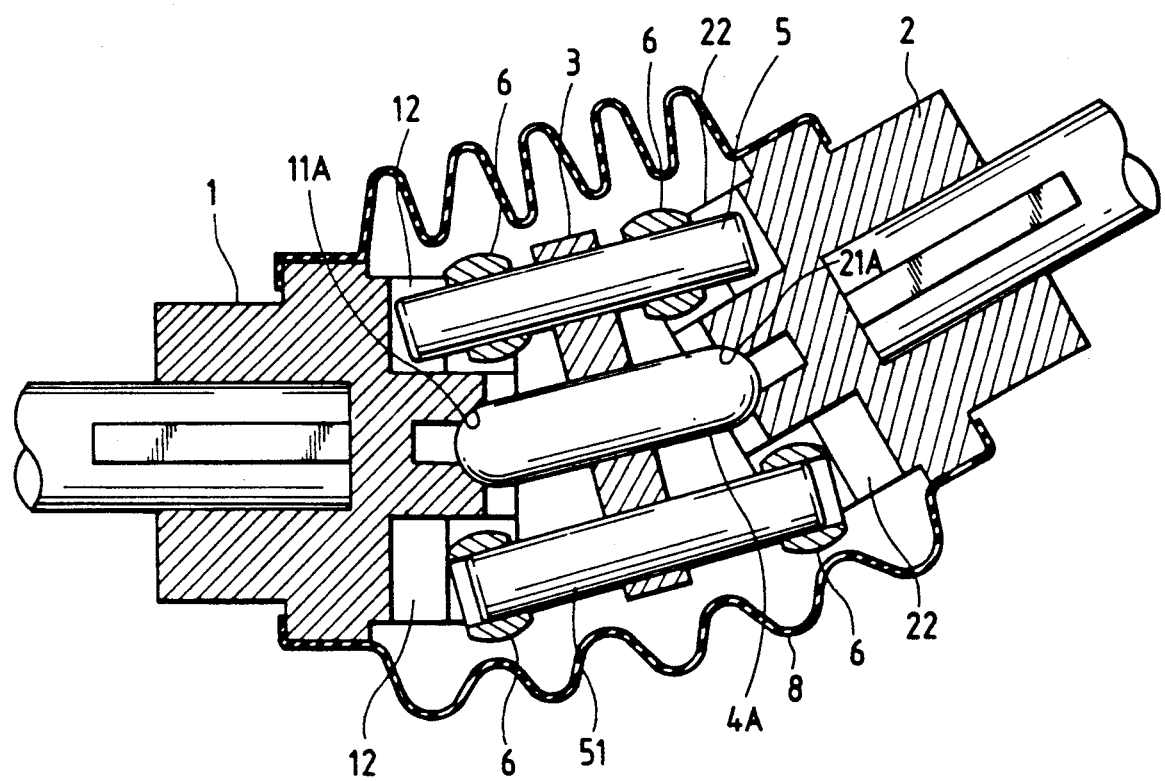
FIG. 7 is a sectional view of another embodiment of a power transmission joint according to the present invention.

FIG. 7 is the same as FIG. 1 except that a guide pin 4A having ends each shaped semi-spherically is used instead of the guide pin 4 and the spherical bearings 6 inserted in the ends of the guide pin 4. The guide pin 4A has spherical bearing portions at its ends. Therefore, the guide pin 4A can position the tie member 3 (3A) at a prescribed axial position without using any members such as the spring washers, the spacers, etc. The guide pin 4A, therefore, simplify extremely the construction of the joint. The guide pin 4A also can bear axial force applied to the shafts 1, 2.

What is claimed is:

1. A power transmission joint comprising:
   a pair of rotational members arranged with an axial space between opposite ends thereof, each of said pair of rotational members having an axis of rotation and axially extending bearing grooves formed symmetrically with respect to the axis of rotation in said opposite ends, each of said bearing grooves having a pair of radially extending partially cylindrical surfaces for receiving a spherical bearing and allowing said spherical bearing to radially and rotatably move;
   a guide pin disposed between each pair of rotational members and having end portions thereof rotatably and swingably engaged with said opposite ends of said rotational members at the respective axis of rotation of the rotational members;
   a pair of drive pins each disposed between said opposite ends of said pair of rotational members and arranged in parallel and symmetrically disposed with respect to an axis of said guide pin and engaged with the opposite ends of said rotational members so as to transmit torque while allowing said drive pins to slide in radial directions of said rotational members, swing and axially slide relative to said rotational members, respectively in accordance with a rotation of the rotational members, each of said drive pins are axially slidably inserted in spherical bearings held in said bearing grooves; and
   a tie member disposed between said opposite ends of said rotational members and rigidly tying said guide pin and said drive pins so as to maintain a fixed relative condition of said guide pin and said drive pins.

2. A power transmission joint according to claim 1, wherein said rotational members each have a bearing receiving hole in said opposite end at the rotation axis and receive a spherical bearing, said guide pin is inserted in and supported by said spherical bearing.

3. A power transmission joint according to claim 2, wherein a plurality of spring washers are mounted on said guide pin between each said spherical bearing and said tie member so as to cause said spherical bearings to rest in said bearing receiving holes, and to restrict axial movement of said tie member.

4. A power transmission joint according to claim 2, wherein a pair of spacer tubes are mounted on said guide pin so as to cause said spherical bearings to rest in said bearing receiving holes, and to restrict axial movement of said tie member.

5. A power transmission joint according to claim 2, wherein said tie member tying said guide pin and said drive pins in a disc disposed in the middle of said guide pin and said drive pins.

6. A power transmission joint according to claim 5, wherein said disc is made of aluminum.

7. A power transmission joint comprising:
   an input shaft and an output shaft each provided with, at one end, a spherical bearing receiving hole at a rotational axis thereof and a pair of bearing receiving grooves formed symmetrically with respect to said spherical bearing receiving hole and each having partial cylindrical surfaces receiving a spherical bearing and allowing said spherical bearing to move radially and rotatably;
   a guide pin rotatably and swingably inserted, at both ends of said guide pin, in said spherical bearing receiving holes;
   a pair of drive pins arranged in parallel to and symmetrically with respect to an axis of said guide pin, and axially slidably inserted in spherical bearings supported in a respective bearing receiving groove in each shaft; and
   a tie member securing said guide pin and said drive pins to form a rigid assembly thereof.

8. A power transmission joint according to claim 7, wherein each end of said guide pin is formed semispherically and is rotatably and swingably inserted in said spherical bearing receiving hole.

9. A power transmission joint according to claim 7, wherein said guide pin is inserted in said spherical bearing receiving hole through spherical bearings.

10. A power transmission joint according to claim 9, wherein a pair of spacer tubes each are mounted on said guide pin between said spherical bearing and said tie member so as to restrict axial movement of the tie member.

11. A power transmission joint according to claim 9, wherein there are provided with a plurality of spring washers disposed between said spherical bearings for said guide pin and said tie member to urge said spherical bearings to fit in said spherical bearing receiving hole.

12. A power transmission joint according to claim 11, wherein at least one spring washer is provided on each side of said disc.

* * * * *